April 8, 1941.   E. KENNEDY   2,237,672
PLUMBER'S FITTING
Filed June 22, 1939   2 Sheets-Sheet 1
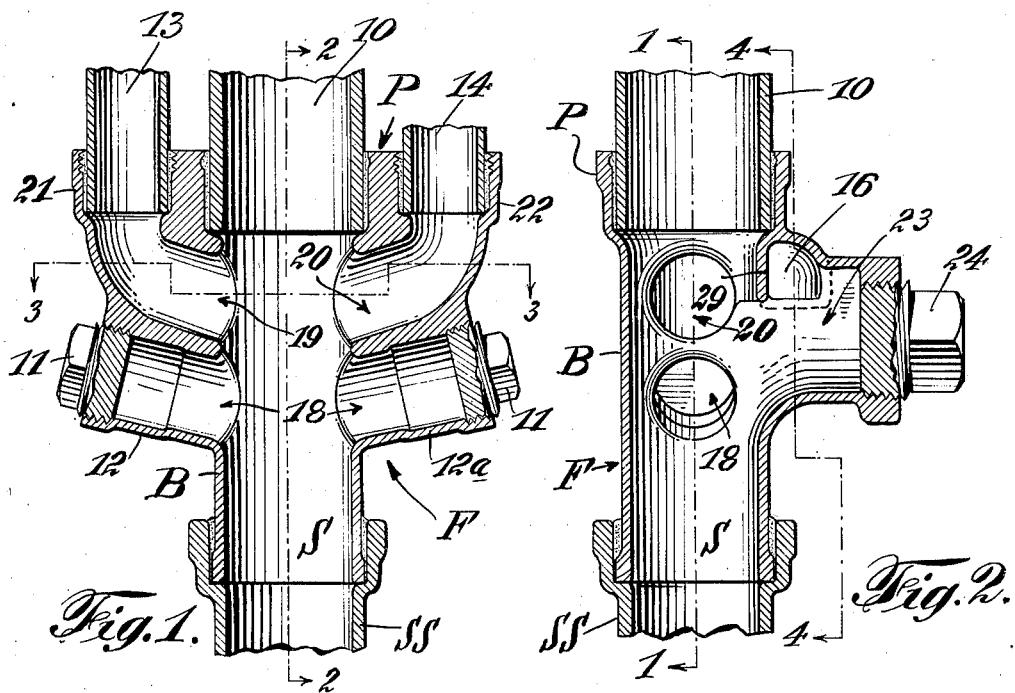
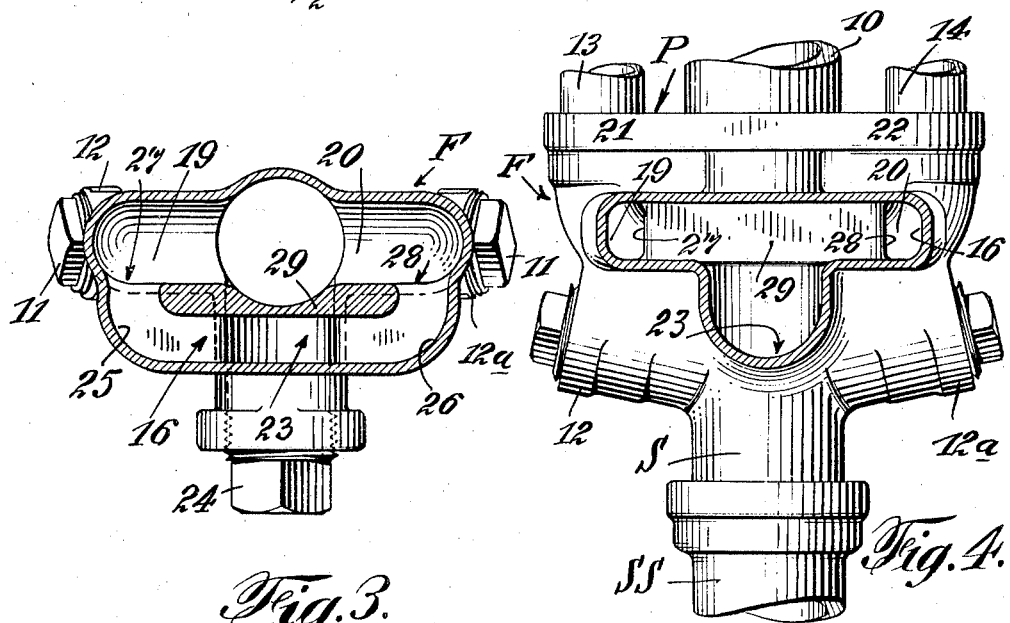
INVENTOR.
Edward Kennedy
BY C. P. Goepel
his ATTORNEY.

April 8, 1941.    E. KENNEDY    2,237,672
PLUMBER'S FITTING
Filed June 22, 1939    2 Sheets-Sheet 2
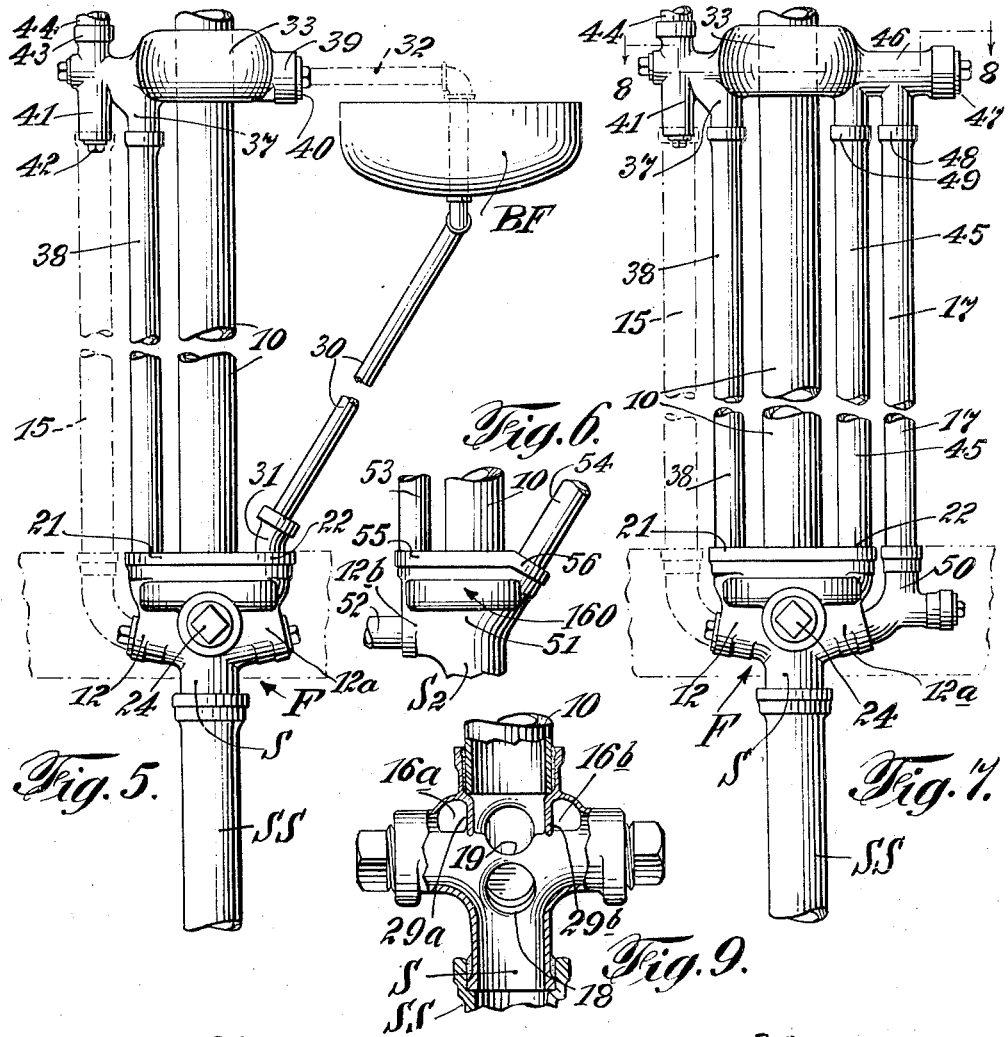
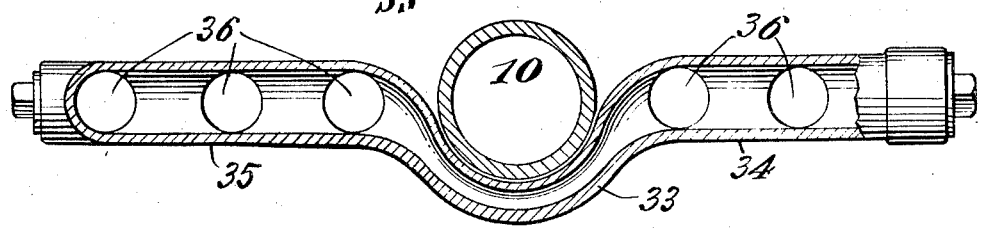
INVENTOR.
Edward Kennedy
BY  C. P. Goepel
his ATTORNEY.

Patented Apr. 8, 1941

2,237,672

UNITED STATES PATENT OFFICE 2,237,672

PLUMBER'S FITTING

Edward Kennedy, New York, N. Y.

Application June 22, 1939, Serial No. 280,563

2 Claims. (Cl. 285—210)

This invention relates to a plumbing system, and has for its general object to provide waste and vent stack elements embodying novel and improved means for venting effectively a plurality of fixtures in the several stories of a high building, the novel elements being designed for enclosure and concealment within the walls of the building.

Another object of the invention is to provide fittings of a novel type to which connections may be attached at either side, the venting being so disposed that it will operate no matter on what side of the fitting any given connection is made.

Heretofore, such fittings could only be installed in conjunction with connections attached from one side, the fittings not being adapted to permit the use of connections disposed at another side than that for which a particular unit was designed.

Under such conditions, the invention consists in the provision of a plumber's fitting to be used in high buildings and so constructed and arranged as to permit the downward flow of the waste and to provide ample venting of connections leading from basins, toilets, sinks, and the like; and the invention consists also in providing a fitting to which connection may be attached selectively at any and all of its sides; the venting being so arranged that no matter on what side the connection shall be made, the venting will operate effectively.

Other features of the invention will become apparent as the description of the particular physical embodiment selected to illustrate the invention proceeds.

In the accompanying drawings, like characters of reference have been applied to corresponding parts throughout the several views, in which:

Figure 1 is a fragmentary detail view in vertical section of a plumber's fitting in the construction of which the present invention has been embodied;

Figure 2 is a similar detail view taken on the line 2—2 of Figure 1;

Figure 3 is a similar detail view in horizontal section taken on the line 3—3 of Figure 1;

Figure 4 is a rear view in vertical section taken on the line 4—4 of Figure 2;

Figure 5 is an assembly view in side elevation upon a smaller scale, of a modification in the construction of which the invention has been embodied;

Figure 6 is a modified form of fitting which embodies certain features of the invention, the fitting illustrating a form of the invention which does not require a symmetrical disposition of the elements of the fitting;

Figure 7 is a view similar to Figure 5, but showing the plumbing elements illustrated in Figure 1, with additional attachments;

Figure 8 is a fragmentary detail view on a larger scale, taken in horizontal section on the line 8—8 of Figure 7; and Figure 9 illustrates a modification which takes the form of a double fitting, resembling the type shown in Figures 1 and 2, except that two vent passages with barriers are illustrated.

Viewed in its broader aspect, and with reference particularly to the now-preferred embodiment thereof illustrated in Figures 1 to 7, inclusive, the reference character F designates generally a novel form of plumber's fitting which comprises a unitary structure adapted to be manufactured, stored, transported and marketed as such, and which is illustrated in Figures 1 and 2 as formed with a central or body portion B having a spigot portion S and a socket portion P constructed and arranged to be fitted in a conventional waste line or stack which includes an upper pipe section 10 of conventional form and a lower or socket section SS of corresponding shape, so that the novel unit is in every way complemental to the standard pipe sections familiar to those conversant with the plumber's art.

At 12 and 12a the body B is provided with side inlets, shown as having plugs 11, either of which may be removed at will, for the purpose of gaining access to the waste line or for installing a connection such as that illustrated in broken lines at 15 in Figure 5, or that in full lines in Figure 7 at 17. Instead of a plug 11, any other known closure can be used.

Above the openings 18 from the branch waste inlets 12 and 12a (see Figure 1) provision is made of vent outlet openings 19 and 20, at either side of the body, and sockets 21 and 22 are formed in the body of the fitting, adapted each to receive one of the vent pipes 13 and 14, it being understood that either or both of the vents may be utilized as occasion may require. One of these pipes 13 or 14 can be used as a waste.

In pursuance of the invention, the body of the fitting is provided with a cross-connecting passage 16 (see Figures 3 and 4), which is in communication with the waste line through a throat opening 23, adapted to be closed by a removable screw plug 24, and from which passage ducts 25 and 26 lead to ports 27 and 28 opening respectively into the vent outlet openings 19 and 20. These openings are separated by a barrier wall 29 which serves as the inner wall of the cross-passage 16.

Accordingly, this passage, extending as it does clear across the fitting, permits the vent air to operate no matter whether a connection is made to socket 21 or socket 22, or to each of said sockets.

The sectional view shown in Figure 4 illustrates also how the vent passage 16 operates with respect to either of the connections 12—12a, and as the fitting is of symmetrical construction and arrangement throughout, any suitable connection may be made to it at any time, and much time and labor will be saved in effecting each such installation.

Various applications of the fitting among a great variety of installations for which it is applicable, are illustrated in Figures 5 and 7. For example, if it is desired to connect a basin fixture BF which is about two feet above the floor, this can be done, as illustrated in Figure 5, by installation of a pipe 30 connecting, as at 31 with a suitable coupling fitted in the socket part 22, the other upper end of the fitting operating as a vent to pipe 38.

If it is desired to provide a further vent, this may be done by means of the connection indicated in dotted lines in Figure 5, at 32, which is characterized by a bend 33, passing around the waste stack 10, and having at each side thereof a manifold, as 37—39, with openings 36 which may be of any desired number and disposition (see Fig. 8).

In Figure 5 there is a manifold at the left-hand side having a spigot 37 to which a vent pipe 38 leads from the socket 21 of fitting F; while the vent pipe 32 is connected to a single nipple 39 after removal of the closure plug 40. The manifold, beyond nipple 37, has a T 41 to the lower end of which the vent pipe 15 is connected, after removal of the plug 42, and at the upper end 43 an extension vent riser pipe 44 is provided, an arrangement which can be extended as desired and found suitable.

In Figure 7 a similar arrangement of connections is provided on the left-hand side, as indicated by use of the same numerals, while the right-hand manifold 46 has connections 47 and 45 symmetrically disposed with respect to the connections 15 and 38, the manifold 46 being modified in the respect that it has nipples 48 and 49 on its lower side, the end plug 47 being similar in disposition to the end plug 40 in Figure 5. The fitment 50 connecting the lower end of pipe 47 into the opening 12a is suitably shaped for its intended purpose, as clearly shown in Figure 7.

In the manifold structure of Figure 8, which is a horizontal sectional view of a modification taken on a line corresponding to the line 8—8 in Figure 7, two openings 36 are shown at the right-hand side and three similar openings at the left-hand side. The manner of installing and using this form will be clearly apparent, without further explanation, from the earlier description of the forms shown in Figure 5 and Figure 7.

Figure 6 illustrates a modified fitting in the construction of which is embodied the basic idea of means which characterize the present invention in the important respect that there are combined in a unitary structure a body adapted to be interfitted with the vertically aligned standard sections of a stack of waste pipes of which only the section 10 is illustrated—the body 51 having a spigot 52 adapted to be inserted in the socket (not shown) of a waste pipe section like that shown at SS in Figures 5 and 7.

In this form a socket 12b receives a waste pipe leading from any form of fixture (not shown), and vents 53 and 54 are led into suitable sockets 55 and 56, all being in communication internally through the medium of a cross passage numbered 160 which may correspond in all essential respects to the passage 16 shown in Figures 1 to 5 and already described.

This form of the invention is illustrative of asymmetrical embodiments of the invention, many different forms of which may be adapted for use in different applications wherein the invention may be applicable.

Another modification is illustrated in Figure 9, which shows a double fitting, the only difference from the form shown in Figures 1 to 4, 5 and 7 being that there is a cross-passage 16a and a cross-passage 16b, affording a more extensive cross-connection than that of the single cross-passage 16 of the other figures. Each of these cross-passages has its own barrier wall, 29a, and 29b, like the barrier 29 already described, and the parts in this figure are alike in construction, arrangement and function to corresponding parts bearing like reference characters in the form already described with respect to Figures 1 to 5 and 7. This modification is adapted to a case where there is a double bathroom back to back.

From the foregoing description considered in connection with the accompanying drawings, the construction, manner of use and several advantages of my present improvements will be clearly and fully understood. It will be apparent that I have provided a simple and inexpensive fitting combining in a compact, single, unitary structure the means for cross-venting a main waste stack with numerous branch waste connections from various plumbing fixtures so disposed that no matter from what side the connection is to be made, all such connections to the several fixtures can be installed with maximum convenience and with a minimum expenditure of time and cost of materials, and saving of space.

The fitting shown in each of the figures embodies the basic idea of means which underlies the invention, and in each of the embodiments the fitting constitutes a new article of manufacture which can be manufactured, stored, marketed and installed as a complete unit.

I have described an embodiment of my invention, but it will be clear that changes may be made within the principle of the invention described, without departing from the scope of the subjoined claims.

I claim:

1. As a new article of manufacture, a plumber's fitting adapted to be interfitted with waste-stack sections in a building having numerous fixtures intended to be connected-in to said waste-stack and requiring to be vented; said fitting comprising in a unitary structure a body provided with a central waste channel having spigot and socket terminals adapted to be connected into the waste-stack, said body having a set of lateral inlets constructed and arranged to receive selectively from different sides of said channel lead-in connections from one or more of said plumbing fixtures, said body having a set of outlet openings from said central channel adapted to be connected selectively with vent pipes, and said body further having a cross-passage in communication with said central waste channel and with each of said vent outlets and having a throat extending downwardly along said central waste channel between said lateral inlets, said inlets and outlets being so constructed and arranged that all of the waste lines are served by all of the vent lines, regardless of the number of said lines and of the direction from which they are connected-in, said fitting constituting a complete unit, ready for use, and adapted to be stored, transported, marketed and installed as such.

2. A waste pipe section comprising a body portion having a plurality of radially disposed inlets and provided above said inlets with a plurality of radially disposed outlets, said body portion also having a cross passage between the outlets and having a throat extending downwardly into said body portion between the waste inlets.

EDWARD KENNEDY.